(12) United States Patent
Wang et al.

(10) Patent No.: US 10,948,231 B2
(45) Date of Patent: Mar. 16, 2021

(54) MOISTURE PERMEABLE DEVICE, REFRIGERATOR AND MANUFACTURING METHOD THEREOF

(71) Applicant: QINGDAO HAIER JOINT STOCK CO., LTD, Shandong (CN)

(72) Inventors: Aimin Wang, Shandong (CN); Enwei Ding, Shandong (CN); Min Li, Shandong (CN); Weiying Zhang, Shandong (CN); Yongsheng Sun, Shandong (CN); Ruitao Tao, Shandong (CN); Guoxin Yu, Shandong (CN)

(73) Assignee: HAIER SMART HOME CO., LTD, Qingdao (CN)

( * ) Notice: Subject to any disclaimer, the term of this patent is extended or adjusted under 35 U.S.C. 154(b) by 321 days.

(21) Appl. No.: 15/528,690

(22) PCT Filed: May 30, 2015

(86) PCT No.: PCT/CN2015/080436
§ 371 (c)(1),
(2) Date: May 22, 2017

(87) PCT Pub. No.: WO2016/101533
PCT Pub. Date: Jun. 30, 2016

(65) Prior Publication Data
US 2017/0268816 A1 Sep. 21, 2017

(30) Foreign Application Priority Data

Dec. 26, 2014 (CN) .......................... 201410824359.0

(51) Int. Cl.
*F25D 25/02* (2006.01)
*F25D 21/14* (2006.01)
(Continued)

(52) U.S. Cl.
CPC ............. *F25D 25/02* (2013.01); *B01D 39/18* (2013.01); *B01J 20/24* (2013.01); *B01J 20/2805* (2013.01);
(Continued)

(58) Field of Classification Search
CPC ........ F25D 25/02; F25D 21/14; F25D 17/042; F25D 2321/147; F25D 11/00;
(Continued)

(56) References Cited

U.S. PATENT DOCUMENTS 3,905,203 A * 9/1975 Jacob ...................... F25D 21/14
62/272
5,385,678 A 1/1995 Witt
(Continued)

FOREIGN PATENT DOCUMENTS

AU 3609678 A 11/2005
CN 103507339 A 1/2014
(Continued)

OTHER PUBLICATIONS

Search Report issued in foreign counterpart European Patent Application No. 15871609.
(Continued)

*Primary Examiner* — Frantz F Jules
*Assistant Examiner* — Martha Tadesse
(74) *Attorney, Agent, or Firm* — Ladas & Parry LLP

(57) ABSTRACT

A moisture permeable device and refrigerator having the same; the moisture permeable device includes a corresponding first surface (110) and second surface (111); at least parts of the first surface (110) and the second surface (111) of the moisture permeable device define a hollow cavity (301); through-holes are provided at regions of the first surface (110) and the second surface (111) of the moisture permeable device defining the cavity (301); and regenerated cel-
(Continued)

lulose is accommodated in the cavity (301). A manufacturing method of the moisture permeable device comprises pouring a regenerated cellulose slurry with a tackifier added thereto into the cavity (301) to form a moisture permeable film, thus allowing omission of an assembling procedure and a non-woven support.

7 Claims, 2 Drawing Sheets

(51) Int. Cl.
*B32B 23/14* (2006.01)
*B01J 20/28* (2006.01)
*F25D 17/04* (2006.01)
*B01D 39/18* (2006.01)
*B01J 20/24* (2006.01)
*F25D 11/00* (2006.01)

(52) U.S. Cl.
CPC ......... *B01J 20/28023* (2013.01); *B32B 23/14* (2013.01); *F25D 17/042* (2013.01); *F25D 21/14* (2013.01); *F25D 11/00* (2013.01); *F25D 2321/147* (2013.01)

(58) Field of Classification Search
CPC ............. F25D 25/025; F25D 2317/041; F25D 25/0051; B01J 20/2805; B01J 20/28023; B01J 20/24; B01D 39/18; B65D 51/16; B32B 23/14
See application file for complete search history.

(56) References Cited

U.S. PATENT DOCUMENTS

| 7,662,214 B1 | 2/2010 | Wickham et al. |
| 2003/0087086 A1 | 5/2003 | Koslow |

FOREIGN PATENT DOCUMENTS

| CN | 103512306 A | | 1/2014 |
| CN | 203454588 U | | 2/2014 |
| CN | 104553167 A | | 4/2015 |
| JP | 01123981 A | * | 5/1989 |
| JP | H0473578 A | | 3/1992 |
| JP | 11294935 A | * | 10/1999 |
| JP | 2000274924 A | | 10/2000 |
| JP | 2005262827 A | | 9/2005 |
| JP | 2006152472 A | | 6/2006 |
| JP | 2014000800 A | | 1/2014 |
| KR | 200292005 Y1 | * | 1/2003 |
| WO | 9604514 A1 | | 2/1996 |

OTHER PUBLICATIONS

Supplementary Search Report issued in foreign counterpart European Patent Application No. 15871609.
Machine English translation of JP2014000800.
Machine English translation of JP2006152472.
Machine English translation of JP2005262827.
CN 104553167 A—English Abstract.
CN 103512306 A—English Abstract.
CN 103507339 A—English Abstract.
JP H0473578 A—English Abstract.
JP 2000274924 A—English Abstract.
CN 203454588 U—English Abstract.

* cited by examiner

MOISTURE PERMEABLE DEVICE, REFRIGERATOR AND MANUFACTURING METHOD THEREOF

This application is a national phase entry under 35 USC 371 of International Patent Application No. PCT/CN2015/080436 filed on 30 May 2015, which claims priority from Chinese Application No. 201410824359.0, filed on Dec. 26, 2014 and entitled "MOISTURE PERMEABLE DEVICE, REFRIGERATOR AND MANUFACTURING METHOD THEREOF", which is incorporated by reference in its entirety in the present application.

TECHNICAL FIELD

The present invention falls within the technical field of refrigerator moisture retention, and specifically relates to a moisture permeable device formed integrally with a plastic member and a refrigerator.

BACKGROUND OF THE INVENTION

A refrigerator is generally provided therein with a special holding container for preserving fresh foods, such as vegetables and fruits, and the humidity, temperature and air convection in the holding container may all affect the freshness of the fresh foods, so that controlling the environment in the container to be within an appropriate condition range may prolong the fresh-keeping period.

The patent CN 203454588 U discloses a storage and moisture-retention box of a refrigerator, in which a gap is formed between the cover and the box body, so that the storage space of the storage and moisture-retention box is not closed, and the inside air and outside air may be exchanged. The technical effect of the solution is to enable the humidity inside and outside the moisture-retention box to be consistent, and if the humidity of the external environment is too high or too low, the humidity inside the box will also depart from the appropriate range.

Patent CN 103507339 A discloses a moisture-sensing moisture permeable film formed by retaining regenerated cellulose on a cellulose base material, wherein the moisture-sensing moisture permeable film is firstly prepared, non-woven fabric is stacked on a surface thereof to prevent the film from breaking, and the film is further fixed onto a frame so as to be assembled on a fruit and vegetable box in the refrigerator. This technique is complicated in the production procedure, and in order to achieve the effect of moisture retention and moisture permeation, the frame should be seamlessly mounted on the fruit and vegetable box, which increases the difficulty of process.

SUMMARY OF THE INVENTION

The present invention aims to solve the problem of the need of a non-woven framework, frame fixing and an assembly procedure in the moisture-retaining moisture permeable structure of the existing refrigerator.

In order to achieve the above-mentioned object of the invention, the present invention provides a moisture permeable device which comprises a first surface and a second surface corresponding to each other. At least parts of the first surface and the second surface of the moisture permeable device define a hollow cavity, through-holes are provided at regions of the first surface and the second surface defining the cavity, and regenerated cellulose is accommodated in the cavity.

As a further improvement of the present invention, at least a part of an inner wall of the cavity is a rough surface.

As a further improvement of the present invention, there are a plurality of relatively independent cavities.

As a further improvement of e present invention, the through-hole has a circular cross section.

In another aspect of the present invention, provided is a refrigerator comprising the above-mentioned moisture permeable device.

In a further aspect of the present invention, provided is a manufacturing method of a moisture permeable device which comprises a first surface and a second surface corresponding to each other. At least parts of the first surface and the second surface of the moisture permeable device define a hollow cavity, through-holes are provided at regions of the first surface and the second surface defining the cavity. The method comprises the steps of:

adding a tackifier into a regenerated fibre slurry;
pouring the regenerated fibre slurry into the cavity;
and squeezing, drying, and smoothing the surface.

As a further improvement of the present invention, the tackifier is high gluten starch.

As a further improvement of the present invention, in the step of pouring the regenerated fibre slurry into the cavity, the moisture permeable device is immersed in the regenerated fibre slurry to enable the slurry to be naturally poured into the cavity.

As a further improvement of the present invention, in the step of pouring the regenerated fibre slurry into the cavity, the regenerated fibre slurry is pressure-injected into the cavity by a syringe.

Compared with the prior art, regarding the moisture permeable device, the refrigerator and the manufacturing method thereof provided in the present invention, by providing the cavity, the regenerated cellulose is directly poured into the cavity to form a moisture permeable film, thereby omitting an assembling procedure and at the same time omitting a non-woven support.

DETAILED DESCRIPTION OF THE INVENTION

Figure 1:
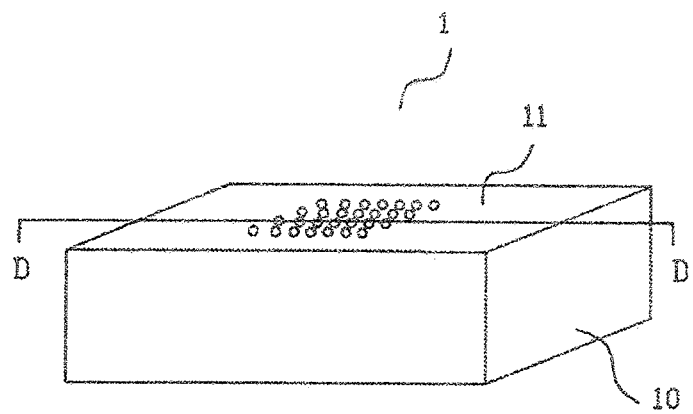
FIG. 1 is a structural schematic view of a refrigerator fruit and vegetable box comprising a moisture permeable device of the present invention.

The present invention will be described below in detail in combination with the particular embodiments shown in the drawings. However, these embodiments do not limited to the present invention, the changes in terms of the structure, the method or the function made by a person skilled in the art according to these embodiments are all included within the scope of protection of the present invention.

The terms expressing locations and directions described in the present invention are all made with reference to a refrigerator door, the end close to the door being a front end, and the end away from the door being a rear end.

In the embodiments of the present invention, the moisture permeable device of the present invention is specifically illustrated with a fruit and vegetable box as an example. However, it should be noted that the technical spirit involved in the embodiments described below can be alternatively used in holding containers in other forms, exemplarily, a drawer for example.

With reference to FIG. 1, a fruit and vegetable box 1 comprises a box body 10 defined by a bottom plate, a front wall, a rear wall, a left side wall and a right side wall, and a cover body 11 above the box body 10.

Figure 2:
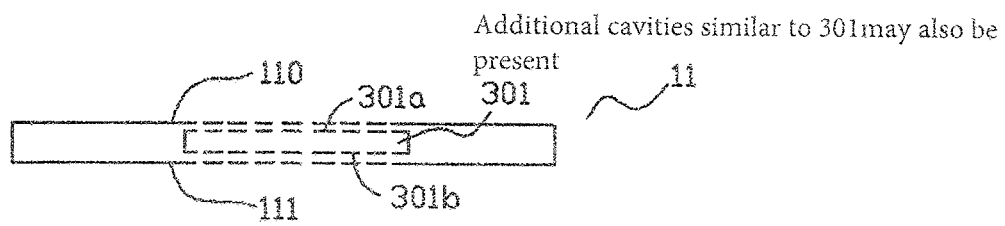
FIG. 2 is a sectional view of a cover body of the fruit and vegetable box in FIG. 1 along a D-D direction.

With reference to FIG. 2, the cover body 11 is integrally formed by injection moulding and comprises an upper surface 110 and a lower surface 111. The upper surface 110 faces the exterior of the fruit and vegetable box 1, and the lower surface 111 faces the interior of the fruit and vegetable box 1. At least parts of the upper surface 110 and the lower surface 111 define a hollow cavity 301. The space between the upper and lower surfaces is configured in such a way to accommodate a moisture permeable material and carry a moisture permeable film.

The inner walls 301a and 301b of the cavity 301 are rough surfaces so as to increase the static friction force between the plastic member and the moisture permeable material.

In the embodiment as shown in the FIG. 2 there is one cavity 301. Optionally, there are a plurality of relatively independent cavities 301.

Figure 3:
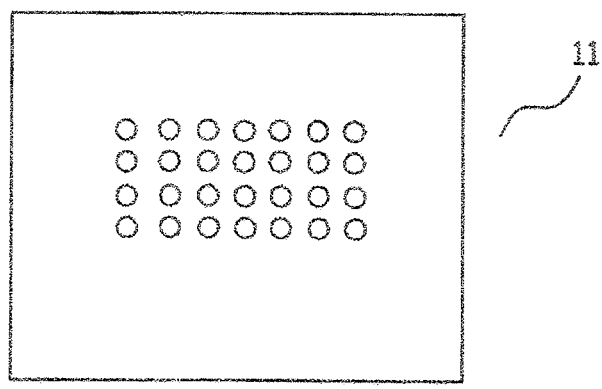
FIG. 3 is a top view of an embodiment of the moisture permeable device of the present invention.
Figure 4:
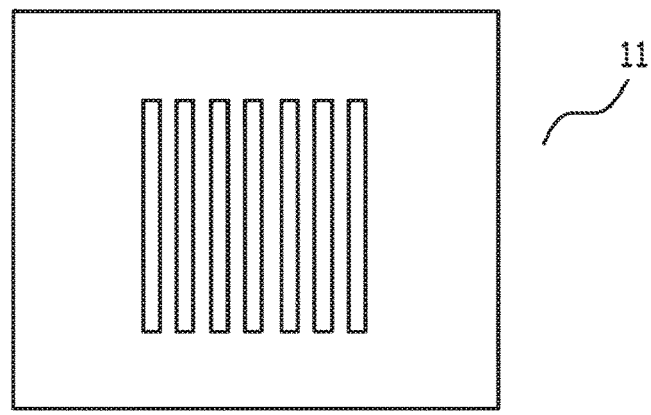
FIG. 4 is a top view of a further embodiment of the moisture permeable device of the present invention.

With reference to FIG. 2 to FIG. 4 in conjunction, through-holes are provided at regions of the upper surface 110 and the lower surface 111 defining the cavity 301, so as to perform the air-water exchange between the moisture permeable material and the external surrounding.

Preferably, there are a plurality of through-holes, which are arranged on the upper surface 110 and the lower surface 111 in a repeating manner. The through-hole may have a cross section in a circular or polygonal shape for example. The arrangement combination rules of the through-holes are not limited as shown in FIGS. 3 and 4, and may also be arranged in a meshed or swirling pattern, for example. A grid structure constituted by the through-holes has the function of a support to support the regenerated cellulose in the cavity 301 to form a film and avoid the damage or contamination of the regenerated cellulose film due to the contact with an article.

The main raw material of the moisture permeable film is regenerated fibre, and the pretreatment of regenerated fibre mainly includes slurry crushing, slurry storing, fine grinding, mixing, and diluting and slushing, so as to manufacture a regenerated fibre slurry. The conditions of the pretreatment are the same as those in a paper-making process, which will not be repeatedly described herein.

Figure 5:
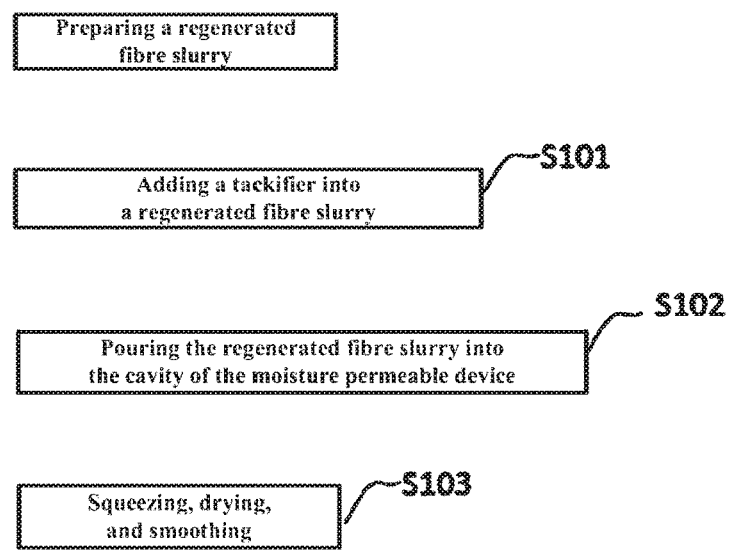
FIG. 5 is a flow chart of a manufacturing method of the moisture permeable device of the present invention.

The regenerated fibre slurry is poured into the cavity 301, and dried to form a moisture permeable film. With reference to the FIG. 5, the pouring method comprises the steps of:

S101, adding a tackifier into a regenerated fibre slurry. The tackifier may be high gluten starch or another colloid to increase the adhesion between the regenerated fibre and the plastic member;

S102, pouring the regenerated fibre slurry into the cavity 301.

S103, squeezing, drying, and smoothing the surface.

In a specific embodiment, S102 includes:

immersing the cover body 11 into a tank containing the regenerated fibre slurry, so that the slurry is naturally poured into the cavity 301 via the through-holes and/or an opening located on a side wall 112 of the cover body;

in a specific preferred embodiment, S102 includes:

pressure-injecting the regenerated fibre slurry into the cavity 301 by means of a syringe.

Figure 6:
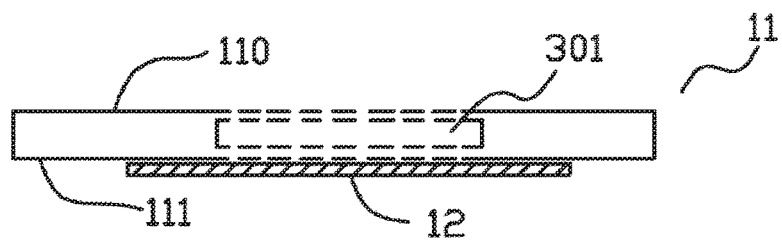
FIG. 6 is schematic view of an embodiment of the manufacturing method of the moisture permeable device of the present invention.

With reference to FIG. 6, preferably, during the pressure injection, a base plate 12 is used to cover at least one hollow-out surface of the cavity 301 so as to prevent the injected, slurry from overflowing out from the through-holes of the surface. The base plate 12 is removed after the regenerated fibre layer is dried and shaped.

It shall be explained that, although the structure and manufacturing method of the moisture permeable device of the present invention are described herein with the cover body 11 as an example, it should be understood that the moisture permeable device may be provided on at least any one surface of the holding container. Preferably, the moisture permeable device is provided on the surface of the holding container closest to a cool air outlet of the refrigerator so as to achieve the optimal anti-condensation and moisture permeable performance.

Compared with the moisture permeable film combined with the holding container by means of a movable structure in the prior art (such as an insertion or snap-fitting structure), in the moisture permeable device of the present invention, the plastic member is a part of the holding container, and the regenerated fibre is directly combined with the plastic member. The plastic member is formed by one-step die sinking and injection molding, thereby omitting an assembly procedure, improving the integrity of the moisture permeable device, and achieving the better tightness. Moreover, the plastic member functions as a framework for the moisture permeable film, and substitutes for the existing technique of using non-woven fabric as a support for the moisture permeable film. The plastic member may also be another hard material, such as metal.

It should be understood that, although the description is given according to the embodiments, but each embodiment does not only comprise an independent technical solution, this narrative manner of the description is only for clarity, and for a person skilled in the art, the description shall be regarded as a whole, and the technical solution in each of the embodiments can also be properly combined to form other implementations that can be understood by a person skilled in the art.

The detailed descriptions set forth above are merely specific descriptions directed to the feasible embodiments of the present invention, and they are not intended to limit the scope of protection of the present invention; any equivalent embodiment or alteration of the present invention, made without departing from the technical spirit of the present invention, shall be included within the scope of protection of the present invention.

What is claimed is:

1. A moisture permeable device, comprises an upper surface and a lower surface corresponding to each other, characterized in that at least parts of said upper surface and lower surface define a hollow cavity; through-holes are provided at regions of said first surface and second surface defining the hollow cavity; and regenerated cellulose mixed with a tackifier is accommodated in said hollow cavity.

2. The moisture permeable device according to claim 1, characterized in that at least a part of an inner wall of said hollow cavity is a rough surface.

3. The moisture permeable device according to claim 1, characterized in that there are a plurality of independent hollow cavities.

4. The moisture permeable device according to claim 1, characterized in that said through-holes have a circular cross section.

5. A refrigerator characterized in that said refrigerator comprises the moisture permeable device as claimed in claim 1.

6. The moisture permeable device according to claim 1, wherein said tackifier is high gluten starch.

7. The moisture permeable device of claim 6 wherein at least a part of an inner wall of said hollow cavity is a rough surface.

* * * * *